United States Patent
Baker et al.

(10) Patent No.: US 11,244,576 B2
(45) Date of Patent: Feb. 8, 2022

(54) SYSTEMS AND METHODS FOR ANALYZING LEARNER'S ROLES AND PERFORMANCE AND FOR INTELLIGENTLY ADAPTING THE DELIVERY OF EDUCATION

(71) Applicant: D2L Corporation, Kitchener (CA)

(72) Inventors: John Allan Baker, Waterloo (CA); Brian John Cepuran, Oakville (CA); Kenneth James Chapman, Kitchener (CA); Michael Cummings, Kitchener (CA); Jeremy Jason Auger, Breslau (CA); Hanan Ayad, Waterloo (CA)

(73) Assignee: D2L Corporation, Kitchener (CA)

( * ) Notice: Subject to any disclaimer, the term of this patent is extended or adjusted under 35 U.S.C. 154(b) by 0 days.

(21) Appl. No.: 16/058,412

(22) Filed: Aug. 8, 2018

(65) Prior Publication Data

US 2018/0350251 A1    Dec. 6, 2018

Related U.S. Application Data

(63) Continuation of application No. 13/180,612, filed on Jul. 12, 2011, now abandoned.

(60) Provisional application No. 61/363,605, filed on Jul. 12, 2010.

(51) Int. Cl.
    *G09B 7/00*    (2006.01)
(52) U.S. Cl.
    CPC ..................... *G09B 7/00* (2013.01)
(58) Field of Classification Search
    CPC ............... G09B 7/00; G09B 7/02; G09B 7/04
    See application file for complete search history.

(56) References Cited

U.S. PATENT DOCUMENTS

| | | | | |
|---|---|---|---|---|
| 6,782,396 | B2 * | 8/2004 | Greene | G09B 7/00 434/323 |
| 2001/0018178 | A1 * | 8/2001 | Siefert | G09B 7/02 434/322 |
| 2002/0107726 | A1 * | 8/2002 | Torrance | G09B 7/02 705/12 |

(Continued)

FOREIGN PATENT DOCUMENTS

CA    2900934 A1    8/2001

OTHER PUBLICATIONS

Eplion, David M., and Thomas J. Keefe. "Practical Tips for Preventing Cheating on Online Exams." Promoting Academic Integrity in Online Education May 2010: 17-19. Rpt. In Magna Publications. N p.: n.p., n.d. Print.

*Primary Examiner* — Jerry-Daryl Fletcher
(74) *Attorney, Agent, or Firm* — Bereskin & Parr LLP/S.E.N.C.R.L., s.r.l.

(57) ABSTRACT

A computer-aided educational system and method to further a student's understanding of a subject matter through analyzing data captured in an electronic learning system so as to determine correlation data corresponding to variables or trends which are determined to enhance, optimize, and/or improve one's learning abilities or understanding of educational content. The system and method generates reports based on the correlation data, develops statistical models that highlight learning and behavioral trends, and/or provides recommendations for adapting the learning system based on the correlation data and statistical models.

18 Claims, 11 Drawing Sheets

(56) References Cited

U.S. PATENT DOCUMENTS

| | | | |
|---|---|---|---|
| 2010/0159437 A1* | 6/2010 | German | G06Q 30/02 434/433 |
| 2010/0190142 A1* | 7/2010 | Gal | G09B 5/00 434/322 |
| 2011/0306027 A1* | 12/2011 | Bridges | G09B 5/00 434/322 |

* cited by examiner

Quiz Question Statistics
Tue Jun 29 16:12:13 EDT

Organization: Lake Valley University
Role: All
Course: Student
Course Code: MATH-CALV2 - Calculus and Vectors - Section 2
MCV4U Quiz: 31 Concepts of Calculus Test

| # | Question Name | Question Type | Answered | Final Score Correlation | Incorrect 0%- | 25% | 50% | 75% | # | Partially Correct 0%- | 25% | 50% | 75% | # | Correct 0%- | 25% | 50% | 75% |
|---|---|---|---|---|---|---|---|---|---|---|---|---|---|---|---|---|---|---|
| 1 | The slope of the tangent with reference to the curve: | MC | 10 | 0.88 | 0 | 0 | 4 | 0 | 4 | 0 | 0 | 0 | 0 | 0 | 6 | 0 | 0 | 0 | 6 |
| 2 | with reference to the | MC | 8 | 0.86 | 0 | 0 | 2 | 0 | 2 | 0 | 0 | 0 | 0 | 0 | 6 | 0 | 0 | 0 | 6 |
| 3 | for the curve: | MC | 10 | 0.81 | 0 | 0 | 2 | 0 | 2 | 0 | 0 | 0 | 0 | 0 | 8 | 0 | 0 | 0 | 8 |
| 4 | A function is said to be | MC | 6 | 0.69 | 0 | 0 | 2 | 0 | 2 | 0 | 0 | 0 | 0 | 0 | 4 | 0 | 0 | 1 | 3 |
| 5 | with reference to the | MC | 12 | 0.67 | 0 | 0 | 2 | 1 | 5 | 0 | 0 | 0 | 0 | 0 | 10 | 0 | 0 | 1 | 9 |
| 6 | Evaluate the following | MC | 9 | 0.63 | 0 | 0 | 1 | 0 | 2 | 0 | 0 | 0 | 0 | 0 | 4 | 0 | 0 | 0 | 4 |
| 7 | with reference to the | MC | 7 | 0.6 | 0 | 0 | 1 | 1 | 1 | 0 | 0 | 0 | 0 | 0 | 5 | 0 | 0 | 1 | 4 |
| 8 | A function can be | MC | 11 | 0.52 | 0 | 0 | 1 | 0 | 1 | 0 | 0 | 0 | 0 | 0 | 10 | 0 | 0 | 3 | 7 |
| 9 | The equation of the | MC | 9 | 0.46 | 0 | 0 | 1 | 0 | 1 | 0 | 0 | 0 | 0 | 0 | 8 | 0 | 0 | 2 | 6 |
| 10 | Evaluate the following | MC | 10 | 0.44 | 0 | 0 | 1 | 0 | 1 | 0 | 0 | 0 | 0 | 0 | 9 | 0 | 0 | 2 | 7 |
| 11 | The function graphed has | MC | 8 | 0.42 | 0 | 0 | 1 | 1 | 2 | 0 | 0 | 0 | 0 | 0 | 6 | 0 | 0 | 1 | 5 |
| 12 | The function graphed has | MC | 11 | 0.41 | 0 | 0 | 1 | 2 | 1 | 0 | 0 | 0 | 0 | 0 | 10 | 0 | 0 | 2 | 8 |
| 13 | The function graphed has | MC | 8 | 0.46 | 0 | 0 | 1 | 0 | 1 | 0 | 0 | 0 | 0 | 0 | 7 | 0 | 0 | 3 | 4 |
| 14 | Evaluate the following | MC | 12 | 0.27 | 0 | 0 | 0 | 0 | 3 | 0 | 0 | 0 | 0 | 0 | 9 | 0 | 0 | 3 | 6 |
| 15 | Evaluate the following | MC | 7 | N/A | 0 | 0 | 0 | 0 | 0 | 0 | 0 | 0 | 0 | 0 | 7 | 0 | 0 | 2 | 5 |
| 16 | An object is falling | MC | 7 | N/A | 0 | 0 | 0 | 0 | 0 | 0 | 0 | 0 | 0 | 0 | 7 | 0 | 0 | 4 | 3 |
| 17 | Evaluate the following | MC | 8 | N/A | 0 | 0 | 0 | 0 | 0 | 0 | 0 | 0 | 0 | 0 | 8 | 0 | 0 | 1 | 7 |
| 18 | An object is falling | MC | 9 | N/A | 0 | 0 | 0 | 0 | 0 | 0 | 0 | 0 | 0 | 0 | 9 | 0 | 0 | 2 | 7 |
| 19 | Evaluate the following | MC | 10 | N/A | 0 | 0 | 0 | 0 | 0 | 0 | 0 | 0 | 0 | 0 | 10 | 0 | 0 | 4 | 6 |
| 20 | An object is falling | MC | 11 | N/A | 0 | 0 | 0 | 0 | 0 | 0 | 0 | 0 | 0 | 0 | 11 | 0 | 0 | 4 | 7 |
| 21 | An object is falling | MC | 12 | N/A | 0 | 0 | 0 | 0 | 0 | 0 | 0 | 0 | 0 | 0 | 12 | 0 | 0 | 4 | 8 |

Question Score and Final Quiz Score Distribution

FIG. 3

Domain: (select...)
Tool Access

(select...)

- ◇ Date
  - ⇑ First Access Date
  - ⇑ Last Access Date
- 🖳 Measures
- ◇ Org
  - ⇑ Organization
  - ⇑ Organization Short Na
  - ⇑ Org Unit Name
  - ⇑ Org Unit Code
  - ⇑ Org Unit Type Name
  - 🖳 Org Groupings
- ◇ User
  - ⇑ First Name
  - ⇑ Last Name
  - ⇑ Username
  - ⇑ Org Defined ID
- 🖳 Tool

Chart | Table | Crosstab | Sample Data

90

Click To Add a Title

| Username | First Access Date | | |
|---|---|---|---|
| | First Access Date | Q1 2010 | Q2 2010 | First Access Date Totals |
| aaalbers | | | |
| aaanerud | | | |
| aaas | | | |
| aabbe | | | |
| aabdin | | | |
| aabdula | | | |
| aabdulla | | | |
| aabeln | | | |
| aabetrani | | | |
| aabrew | | | |
| aabshire | | | |
| Username Totals | | | |

*First Access Date* ☒
Change Grouping ▲
  Year
  • Quarter
  Month
  Day
Delete Column Summary
Remove from Crosstab
Switch to Row Group
Create Filter

SYSTEMS AND METHODS FOR ANALYZING LEARNER'S ROLES AND PERFORMANCE AND FOR INTELLIGENTLY ADAPTING THE DELIVERY OF EDUCATION

RELATED APPLICATIONS

This application is a continuation of U.S. patent application Ser. No. 13/180,612, filed Jul. 12, 2011, which claims the benefit of U.S. Provisional Patent Application Ser. No. 61/363,605 filed Jul. 12, 2010, of which the entire contents of both are hereby incorporated by reference herein for all purposes.

FIELD

The embodiments herein relate to the field of electronic learning, and in particular to systems and methods for analyzing information relating to an organization and its members so as to report on various trends or measurables. In addition, the systems and methods adapt the delivery of organizational programs or education based on the analyzed trends and measureables so as to enhance the effectiveness and/or efficiency of the educational delivery.

INTRODUCTION

Electronic learning (also called e-Learning or eLearning) generally refers to education or learning where users engage in education related activities using computers and other computer devices. For examples, users may enroll or participate in a course or program of study offered by an educational institution (e.g. a college, university or grade school) through a web interface that is accessible over the Internet. Similarly, users may receive assignments electronically, participate in group work and projects by collaborating online, and be graded based on assignments and examinations that are submitted using an electronic dropbox.

Electronic learning is not limited to use by educational institutions, however, and may also be used in governments or in corporate environments. For example, employees at a regional branch office of a particular company may use electronic learning to participate in a training course offered by their company's head office without ever physically leaving the branch office.

Electronic learning can also be an individual activity with no institution driving the learning. For example, individuals may participate in self-directed study (e.g. studying an electronic textbook or watching a recorded or live webcast of a lecture) that is not associated with a particular institution or organization.

Electronic learning often occurs without any face-to-face interaction between the users in the educational community. Accordingly, electronic learning overcomes some of the geographic limitations associated with more traditional learning methods, and may eliminate or greatly reduce travel and relocation requirements imposed on users of educational services.

Furthermore, because course materials can be offered and consumed electronically, there are fewer physical restrictions on learning. For example, the number of students that can be enrolled in a particular course may be practically limitless, as there may be no requirement for physical facilities to house the students during lectures. Furthermore, learning materials (e.g. handouts, textbooks, etc.) may be provided in electronic formats so that they can be reproduced for a virtually unlimited number of students. Finally, lectures may be recorded and accessed at varying times (e.g. at different times that are convenient for different users), thus accommodating users with varying schedules, and allowing users to be enrolled in multiple courses that might have a scheduling conflict when offered using traditional techniques.

Despite the effectiveness of electronic learning systems, some users of an electronic learning system are unable to perform as well as their peers. Electronic learning systems have heretofore been unable to determine the factors associated with some users poor performance, and if current educational delivery mechanisms are ineffective for such users, electronic learning systems are unable to alter the delivery mechanism on a student by student basis. In addition, administrators often wish to analyze and report on an organization's effectiveness either for their own purposes or to satisfy requirements set forth by relevant governing bodies.

Accordingly, the inventors have identified a need for systems, methods, and apparatuses that attempt to address at least some of the above-identified challenges.

SUMMARY OF VARIOUS EMBODIMENTS

Electronic learning systems may help facilitate the capture of information or data relevant to the learning environment, the organization, and various stakeholders in the organization (e.g., administrators, instructors, students, etc.). Information relevant to these parties may be, for example, historical usage data, performance of various stakeholders, and demographic profiles of the organization and its various stakeholders. Electronic learning systems can thus store and capture organizational and stakeholder profiles which may be carried with the respective stakeholder throughout that stakeholder's career or life.

Electronic learning systems may be made more effective by analyzing at least a part of the aggregate captured data. Analysis of such data may reveal, for example, trends or measureables meeting threshold targets. Because trends and measurables may be used in predictive models, the analysis of the aggregate captured data has value in that organizations may integrate workflows or systems which react (or act in concert with) to predictive modeling.

For example, data which may be captured and further analyzed for trends and measureables may include: user profile information (e.g., age, sex, name, interests, education, career, etc.), demographic information, learning styles, learning goals, preferred systems, information relating to devices owned by users and the technical capabilities of such devices, accessibility information, past history of users, individual profiles with whom the user has worked well in the past, enrollment history, withdrawal history, history of achievements, history of usage information, keywords used, areas of interest to specific users.

Analysis of at least a part of the information provided above may produce aggregate data that highlights historical information, trending information, and measurable information. Such information may be used or harnessed on an organizational or individual level or scope. The information may also have value to subsets of the organization or certain groupings of individual users within an organization.

In some embodiments, in response to the analyzed data, workflows may be defined in the educational environment (e.g., within the electronic learning system). The workflows may use key indicators from the stakeholders involved and may tailor learning experiences to each stakeholders skill level, and learning or teaching style. For example, in some embodiments, agents, engines, or applications may listen for changes to key thresholds and initiate additional workflows for remediation, access to advanced materials, and assignment of mentorship or peer interaction.

For example, when a user begins a new activity such as writing a blog posting, the system may analyze the user's past work and provide suggestions on themes, templates, and other starting materials in order to assist the user in directing or creating new work. Another example is that the system may analyze the keywords and materials used by a user (e.g., a student) and suggest additional readings from a variety of other sources, in addition to sources outside the established curriculum. For example, the additional readings may provide learning material or perspectives that are of different viewpoints than the defined or established curriculum or of the user's past work. The system may also provide the system with the ability to discuss, critique, or synthesize ideas.

The benefits associated with analysis of the aggregate data captured by electronic learning systems is not limited to students and targeted delivery of education to those students. Electronic learning systems may use the analysis of such data to provide administrators and instructors with key indicators for courses and student performance. Administrators may use the captured data and analyzed information to report to accreditation bodies or other stakeholders interested in education or performance of students. Administrators and instructors may also be provided with the ability to drill-down into specific students or activities. The electronic learning system may provide a near real-time data analysis in a manner which does not affect the performance of the electronic learning system. The system may classify and quantify student performance and further allow manual or automatic flagging and identifying of behaviors based on student specific, demographic, or aggregated data.

In some embodiments, the analytic engine performing the analysis on the data may highlight statistically significant data, trends, and help identify models which reflect such trend and data. These trends and models may then be used by the analytic and/or predictive engines to predict certain events. For example, such predictions may relate to how certain students will perform in a specific course, or subject matter, and how such students will perform in courses taught by specific teachers. The analytic and/or predictive engines may map a student's behavioral model or characteristics onto the courses, instructors, subject matter, curriculum, etc. to enable the electronic learning system to determine how successful a specific or type of student may be with respect to specific courses, curriculum, and/or subject matter. For those students which the electronic learning system (e.g., the analytic and predictive engines, specifically) has targeted as at-risk students, some embodiments may include an adaptive engine which adapts at least one of the delivery mechanisms of the education material, the instructional method, the educational content, and etc. to attempt to direct the targeted at-risk students towards behavioral characteristics or academic characteristics that more accurately reflect those of successful students.

For example, in some embodiments, the analysis of such data may reveal significant course pattern groupings. For example, the analysis may illustrate that a positive correlation between the length of time a student uses a particular tool provided in the electronic learning system and grade achieved in the subject matter relating to such usage. Accordingly, for targeted at-risk students, an analytic or recommendation engine may recommend that the targeted at-risk students spend more time using those tools having a positive correlation between time spend using such tools and academic success in that subject matter.

In some other embodiments, the analysis may occur post course—that is an analytics engine may analyze the students success or failures in performance of a course in the context of a variety of factors. Base on such analysis, the analytic engine and/or the predictive engine may highlight or recommend courses to students or administrators based on the analysis that students who tend to like specific courses, may also tend to like a certain set of other courses.

In some other embodiments, the analytic engine and/or the predictive engine may highlight or recommend courses taught by professors who the analytic and/or predictive engine have identified as having a teaching style that specific students may find appealing or with which specific students may thrive.

In some other embodiments, the analytic engine and/or the predictive engine may identify anomalies. In some embodiments, such identified anomalies may be used to target academic dishonesty. In some embodiments, such identified anomalies may identify students who could have done better or could have improved.

In some embodiments, the system may analyze course survey data and/or other relevant data or evidence collected from the e-learning environment to make educational recommendations. For example, based on the analytics of at least a part of the aggregate data, the workflows or systems may automatically alter or create educational recommendations or the delivery mechanisms associated with e-learning. An example of such workflows or systems may be a recommendation system that optimizes or enhances the match among any combination of at least one student, at least one course, and at least one instructor. The workflows or systems may enable students and/or instructors to understand the respective teaching and/or learning patterns. The workflows or systems may provide a stakeholder with an understanding of how best to accomplish specified educational goals.

In some embodiments, the analytics subsystem or system integrated with the electronic learning system captures data from various sources of evidence including, but not limited to, survey data, course assessment details, and usage patterns. This data may then be analyzed to model learning and teaching patterns. The analytics subsystem or engine may make recommendations such as identifying correlations between course preferences, instructor preferences, performance on quizzes in the context of performance in the course, etc.

Based on pattern analysis of at least part of the aggregate captured data, the electronic learning system may have workflows or subsystems that identify stakeholders having similar behaviors and/or similar resultant grades. The stakeholders may be grouped together based on these behavioral characteristics or other identified variables of the pattern analysis. Thus, based on analysis of the captured data, the electronic learning system or analytics subsystem or engine may be able to identify or predict which behavior grouping each student appears trending towards. The predictive engines may predict or recommend how a student can improve from the predicted behavioral grouping to the next higher ranking of behavior. In other words, the predictive engine may help stakeholders identify trends, and more specifically, to identify potentially problematic students (e.g., at-risk students) and recommend a course of action as to how to change course for the grouping for which the identified problematic student is heading towards. Such recommended course of actions may include, for example, recommended readings, recommended homework, recommended discussion tools, recommended partners, etc. Alternatively, the analytics engine (or subsystem) may identify behaviors or learning delivery mechanism which correspond to positive factors—that is the analytics engine may identify those factors which appear to enhance the ability for students to comprehend and learn the educational curriculum. By identifying the factors positively correlated with good performance, the system may synthesize a educational delivery mechanism or curriculum that is specific to each student in attempt to personalize the educational experience in such a way that enhances or optimizes each respective student's learning experience.

In some embodiments, the electronic learning system may include an analytic engine (or subsystem) and a predictive engine (or subsystem). The analytic engine and the predictive engine may be separate and distinct engines, or they may be fully integrated and thus not identifiable from one another. The analytics engine may track usage patterns of the e-learning environment (e.g., usage for a course). Based on the analyzed information, the predictive engine may combine identified patterns with additional and diverse evidence collected over time in order to predict a stakeholder's (e.g., a student's or an instructor's) performance with a measured degree of confidence.

The combination of an analytics engine and a predictive engine empowers stakeholders (e.g., instructors and students) to understand how an educational environment (e.g., a course environment) is utilized and to identify and understand the correlation between the usage data and the levels of achievement of stakeholders (e.g., students).

According to one embodiment, there is provided an electronic learning system, comprising: a plurality of computing devices for communicating with a plurality of users in an educational community; at least one server in communication with each of the plurality of computing devices, at least one of the servers being in communication with at least one data storage device configured to store information associated with at least one of organizational data, and usage data, and at least one of the servers being in communication with at least one storage device configured to host at least one analytics engine, wherein the analytics engine is configured so as to analyze the usage data and generate reports on statistical trends or measurables.

According to one embodiment, there is provided an electronic learning system, comprising: a plurality of computing devices for communicating with a plurality of users in an educational community; at least one server in communication with each of the plurality of computing devices, at least one of the servers being in communication with at least one data storage device configured to store information associated with at least one of e-learning environment data, organizational data, and usage data, and at least one of the servers being in communication with at least one storage device configured to host at least one analytics engine, wherein the analytics engine is configured so as to analyze at least one of the organizational data and the usage data and based on analysis, generate at least one recommendation for adapting a learning environment.

In some embodiments, the analytics engine may analyze information from the e-learning environment (e.g., e-learning environment data, organizational data, and usage data) and make recommendations corresponding to the matching among students, among courses, among instructors, or among one or more of students, courses and instructors. The at least one recommendation allows stakeholders in an organization (e.g., administrators, students, instructors, etc.) to better understand teaching and learning patterns and how educational goals can be achieved. This information may then be applied to adapt learning environments to enhance the effectiveness of the educational delivery mechanisms. For example, the analytics engine may analyze at least one of learning environment data, organizational data, or usage data (e.g., user performance, user trends, historical data) and/or report on instructor trends, student trends, behavioral trends of users or correlation data corresponding to instructor preferences (e.g., preferred educational delivery mechanisms, and preferences for grouping students or learning topics), and student preferences (e.g., types of courses, educational offerings by certain professors, educational offerings certain types of professors, educational offerings being delivered by way of particular mechanisms, and course and/or subject matter preferences).

In some embodiments, the analytics engine may analyze a stakeholder survey and further analyze a subset of the stakeholder survey in order to present patterns or trends in the form of a mosaic plot, which help readers visualize multi-dimensional contingency tables. The subset of the survey may be manually chosen by the individual requesting the report. Alternatively, a report generating engine, which may be a subset of the analytics engine, may automatically select the subset of the survey based on the answers submitted for the survey. Specifically, the report generating engine may select those questions having a set of answers that meet some threshold level of certainty of the expressed opinion or knowledge. For example, the analytics engine may analyze performance trends on a quiz or survey. Based on this analysis, a report may be generated to communicate performance trends that illustrate correlation between performance on a certain question or set of questions with performance on a different question or set of questions. Specifically, the report may illustrate that users (e.g., students) who answered a specific question (or set of questions) incorrectly also tended to answer another question (or set of questions) incorrectly. In other words, the analytics engine may determine positive correlations between performances on a first set of questions with performance on second set of questions. Alternatively, the analytics engine may determine negative correlations between performances on a first set of questions with performance on a second set of questions.

In some embodiments, reports may be generated so as to illustrate relevant information in the form of at least one of: a Mosaic plot, a heat diagram, a correlogram, a pie chart, a tree diagram, and a chart. In some embodiments, colors may be used to identify stronger correlation. For example, a dark blue color may identify strong positive correlation among variables. A lighter blue color may identify a weaker positive correlation among variables. A dark red color may be used to identify a strong negative correlation among variables, and a light red color may be used to identify a weaker negative correlation among variables.

In some embodiments, a color and percentage of a pie graph may identify the correlation among variables. For example, a blue correlation may correspond to a positive correlation among variables. The greater the extent to which the pie or shape is shaded blue, the stronger the positive correlation may be. Similarly, a red correlation may correspond to a negative correlation among variables. The greater extent to which the pie or shape is shaded red, the stronger the negative correlation may be.

In some embodiments, there is a method for analyzing information captured in an electronic learning system, the method comprising: identifying a plurality of users in an educational community; providing a plurality of computing devices for communicating with the plurality of users in the educational community; providing at least one server in communication with each of the plurality of computing devices, each server having at least one data storage devices coupled thereto and configured to store information associated with at least one of e-learning environment data, organizational data, and usage data, and at least one server being configured to host an analytics engine, where in the analytics engine is configured to analyze the at least one of e-learning environment data, organizational data, and usage data.

In some embodiments, the analytics engine is further configured to generate at least one report on at least one of: at least one statistical trend and at least one measurable.

In some embodiments, the analytics engine analyzes data and determines correlation data that corresponds to an interaction between at least two variables of an electronic learning system.

In some embodiments, the analytics engine is further configured to generate at least one recommendation for adapting a learning environment presented to at least one of the plurality of users.

In some embodiments, based on the correlation data, the analytics engine generates at least one recommendation corresponding to mechanisms for enhancing at least one of the plurality of user's interaction with an electronic learning system.

In some embodiments, the electronic learning system and/or electronic portfolios corresponding to each stakeholder, may store personal identification information. Such personal identification information may include, but is not limited to, a password, a login name, a stored image (e.g., of the facial characteristics, among other identifying features), a finger print, a voice sample, etc.

In some embodiments, there may be at least one of video, photographic, and audio capturing devices in all classrooms or in locations spread throughout an organization. Such devices may configured and integrated to the electronic learning system in such a way that the devices capture a sample and the electronic learning system compares that sample to the stored data on each stakeholder. Upon comparing and matching the sample with the stored data to a predetermined or specific threshold which corresponds to a positive match, the electronic learning system may log or otherwise keep track of the presence of such stakeholders. In some embodiments, this recognition of a stakeholders presence throughout the organization may automatically take attendance for a course or for a program. In some embodiments, a workflow may be generated that informs the stakeholders of any absences. In some embodiments, such stakeholders may be allowed to argue against the absence. In some embodiments, remedial education or other efforts may be directed to the stakeholders after such stakeholders are recorded to have been absent more than a threshold number of times.

In some embodiments, the electronic learning system may work with an analytic and/or predictive engine to arrange a seating arrangement (e.g., in a classroom, in a lab, etc.) based on the behavior characteristics and/or preferences of the stakeholders. For example, the system may determine or predict what the best (e.g., or more favorable) seating arrangement to facilitate an interactive classroom discussion based on personal preferences, behavior characteristics, and understanding of the subject matter. In some embodiments, the system may group stakeholders for certain projects (e.g., study projects, labs, etc.). The system may group these stakeholders in such a way to facilitate learning. Such grouping may be based on the respective stakeholders strengths and weaknesses.

DRAWINGS

For a better understanding of the embodiments described herein and to show more clearly how they may be carried into effect, reference will now be made, by way of example only, to the accompanying drawings which show at least one exemplary embodiment, and in which:

FIG. 3 is a chart that illustrates quiz statistics according to one embodiment.

FIG. 9 is a screenshot of the report setup page according to one embodiment.

DESCRIPTION OF VARIOUS EMBODIMENTS

Figure 1:
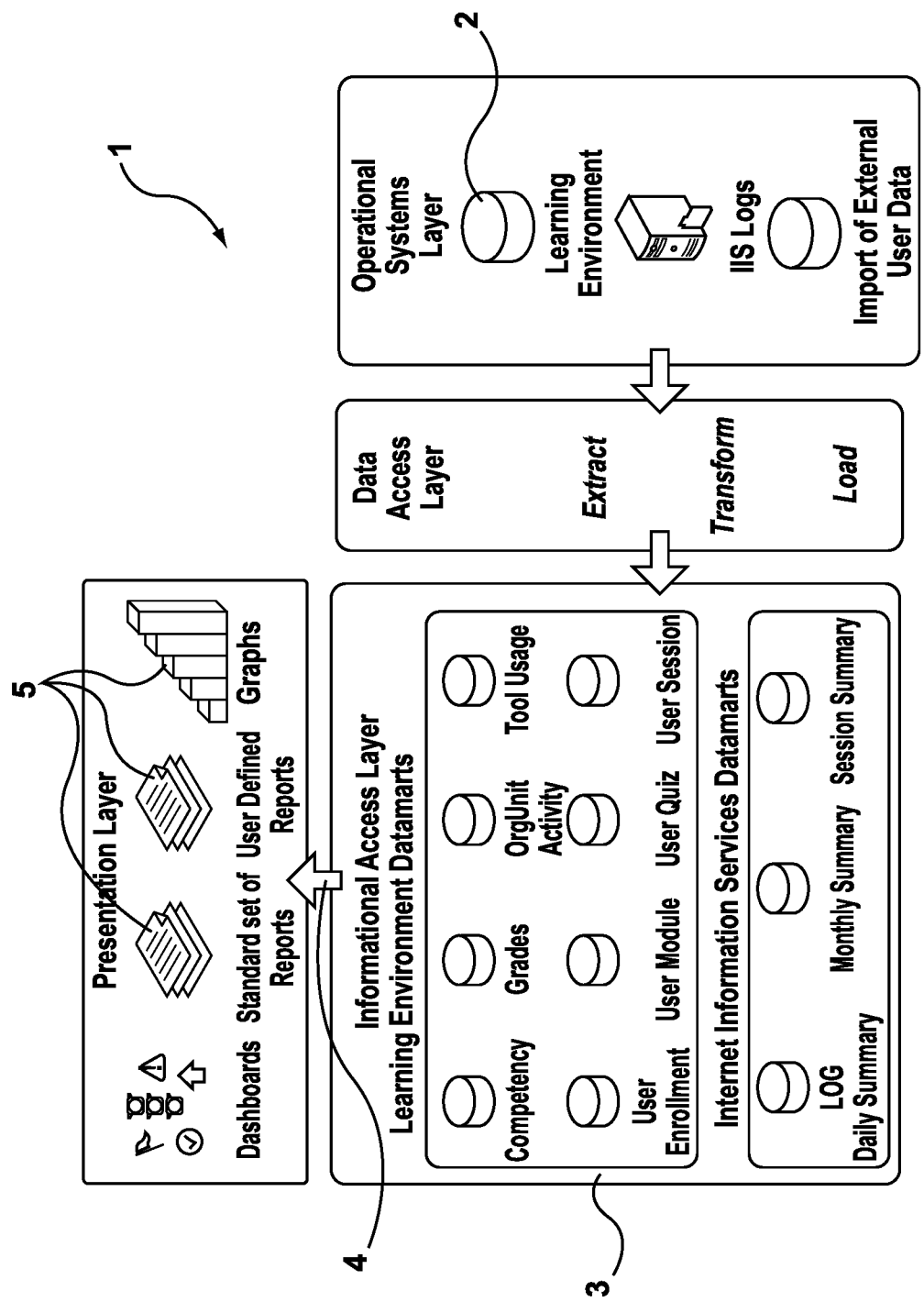
FIG. 1 is a block diagram that illustrates the interaction between components in an electronic learning system according to one embodiment.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein.

Furthermore, this description is not to be considered as limiting the scope of the embodiments described herein in any way, but rather as merely describing the implementation of the various embodiments described herein.

In some cases, the embodiments of the systems and methods described herein may be implemented in hardware or software, or a combination of both. However, in some cases, these embodiments are implemented in computer programs executing on programmable computing device each comprising at least one processor, a data storage device (including volatile and non-volatile memory and/or storage elements), at least one input device, and at least one output device.

For example and without limitation, the computing device may be a mainframe computer, a server, a personal computer, a laptop, a personal data assistant, a tablet computer, a smartphone, or a cellular telephone. Program code may be applied to input data to perform the functions described herein and generate output information. The output information may be applied to one or more output devices, in known fashion.

Each program may be implemented in a high level procedural or object oriented programming and/or scripting language to communicate with a computer system. However, the programs can be implemented in assembly or machine language, if desired. In any case, the language may be a compiled or interpreted language. Each such program may be stored on a non-transitory storage media or a device (e.g. ROM or magnetic diskette) readable by a general or special purpose programmable computer, for configuring and operating the computer when the storage media or device is read by the computer to perform the procedures described herein. Such programs and data associated with such, may be stored on data storage devices. The data storage devices may include volatile or non-volatile computer memory such as RAM, flash memory, video memory and magnetic computer storage devices. The particular storage of various programs or associated data may be stored on different storage devices and/or different storage mediums. For example, a first storage device that stores a portion of the program or data to be stored may include a slower hard disk drive (e.g. a persistent data storage device) while a second data storage device that stores another portion of the program or data to be stored may include a faster RAM (e.g. a dynamic data storage device).

The systems and methods as described herein may also be considered to be implemented as a non-transitory computer-readable storage medium, configured with a computer program, where the storage medium so configured causes a computer to operate in a specific and predefined manner to perform at least some of the functions described herein.

Referring to FIG. 1, illustrated therein is an electronic learning system 1. The electronic learning system includes at least one server in communication with a plurality of devices, which in turn communicate with a plurality of users in an educational community. The plurality of users interface with a learning environment 2 and access educational content and delivery mechanisms for such to learn a curriculum or a subject matter. By way of the interaction between the plurality of users in an educational community and the learning environment, information 3 is captured by the server and stored on at least one storage devices that is coupled to the at least one server. The information 3 may be, for example, e-learning environment data, organizational data, and usage data. This data may represent organizational, institutional, departmental data corresponding to structure or educational work product. This data may also represent information generated through historical usage. This data may also represent information about individuals such as, for example, various stakeholders including administrators, teachers, and students.

The electronic learning system also has a workflow engine 4 (e.g., an analytics engine) which analyzes the information 3 and generates various reports 5 or recommendations which relate to statistical information and trends. This reports also contain or are based on correlation data which the workflow engine 4 has identified as being statistically relevant.

In some embodiments, the analytics engine may analyze users historical data. For example, the analytics engine may be queried to report on the historical access information of a subset of an educational institution's student body. Such an embodiment may be useful for administrators in their reporting on the institution's compliance with various targets and/or regulations. In addition, this information may be helpful in identifying students prone to academic problems, or those students falling outside the behavior norms associated with successful students. If administrators and/or instructors have access to this information quickly and early-on, the administrators and/or instructors may be able to help guide those students needing guidance, or the administrators and/or instructors may be able to adapt the teaching delivery to a mechanism that invokes the interests of these identified students.

The reporting characteristics of the analytics engine may allow administrators and/or instructors to examine the differences in how different students use the electronic learning system and the course resources that the instructor and/or institution has created. The administrator and/or examiner may also examine how the usage changes through a specified time period or how the usage of certain tools may be distinguished from that of other tools. These reporting mechanisms allow for the discovery of clusters as they relate to the usage of the electronic learning system and resources created therein.

Figure 2:
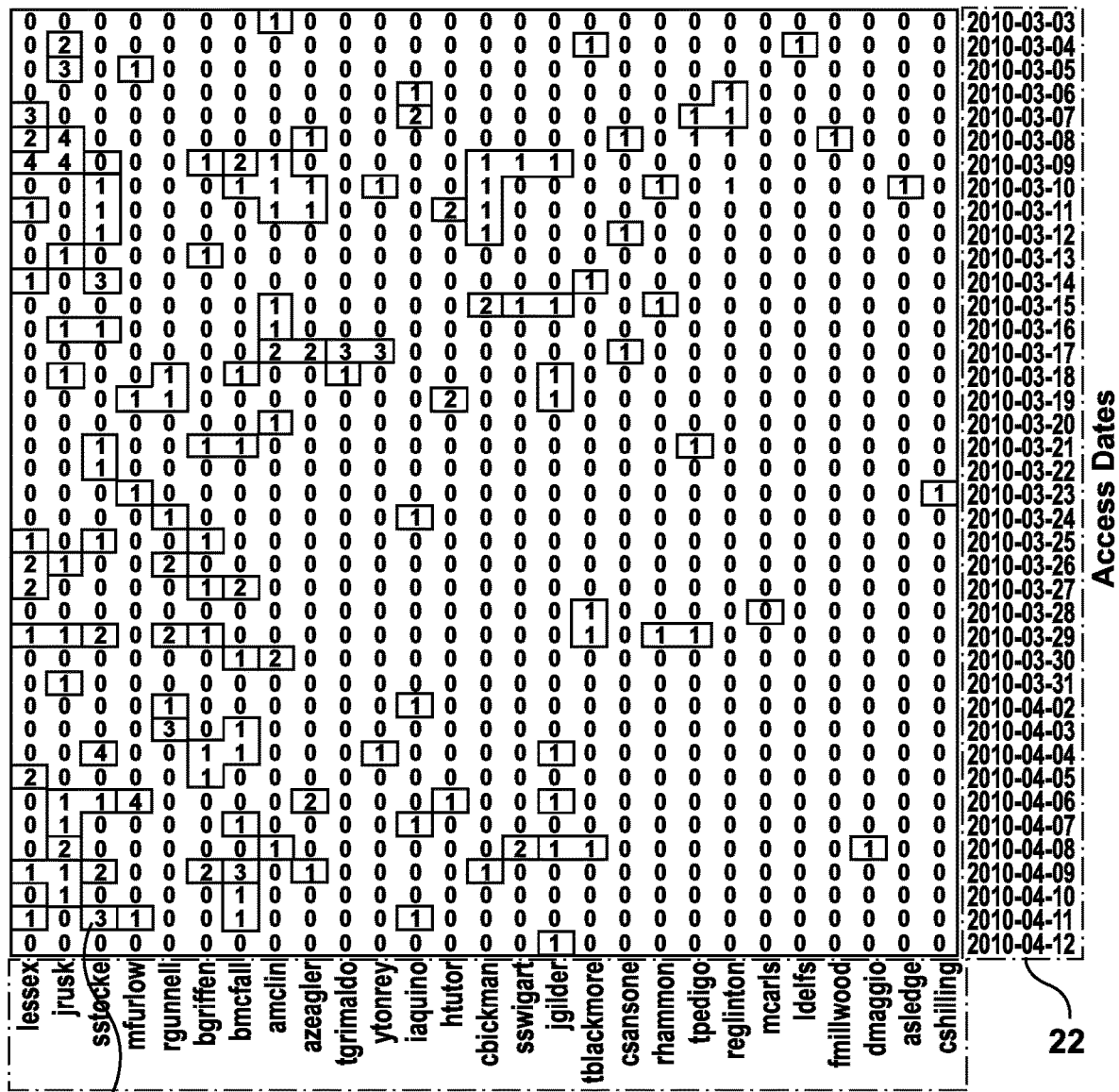
FIG. 2 is a graph that illustrates historical usage data of an electronic learning system according to one embodiment.

FIG. 2 illustrates such a report generated by the analytics engine. The report 20 illustrates historical data corresponding to a recordation of the number of times a course site has been accessed on the electronic learning system. The report 20 includes a list of the user identifiers 21, a list of the dates for which the report was queried 22 and numbers 23 identifying the number of times that a user has accessed the course on a respective date.

In some embodiments, the analytics engine may analyze course data to determine statistically relevant trends or information. For example, the analytics engine may analyze the results of a quiz or test. Based on such an analysis, the analytics engine may determine or identify questions which were too easy, too difficult, or ambiguous. This analysis relies on determining whether a statistically relevant number of users similarly answered questions on a quiz. An instructor may receive a report or analysis of the quiz or test results and learn that certain subject matter was not fully grasped by a statistically relevant number of students, or that a question may have been too difficult, or difficult to understand because a statistically significant number of students failed to answer the question correctly. The analysis engine may also highlight academic integrity concerns if some students answered the questions in a way that was significantly relevant and/or indicated that the students may have communicated or aligned the responses to the quiz. For example, the analytics engine may analyze when a quiz was submitted, and determine whether a group of students submitted a quiz substantially at the same time, and that the responses to the submitted quizzes were substantially similar to the point where the analytics engine determined that the correlation between the submitted quizzes was statistically relevant and that concerns of academic integrity may be invoked.

In some embodiments, the analytics engine may analyze course data such that statistically relevant trends or information assist in highlighting what pattern of usage is significant in terms of a correlation between the usage and a user's grades. This analysis may assist administrators and instructors better understand the picture (e.g., the behavioral characteristics and preferences) of a successful student. Such an analysis may help predict students prone to withdrawing from courses early. The analysis may help predict enrollment trends, particularly as they relate to departments, curriculum, and/or courses. This information may be helpful to administrators in allocating resources to departments, curricula, and/or courses in high enrollment demand.

In some embodiments, the reporting mechanisms of the analytics engine may allow administrators and/or instructors to model the relationship between grades and tool access patterns. In other words, the administrators and/or instructors may be able to analyze the effectiveness of certain learning tools, and the ineffectiveness of certain other learning tools. Further, administrators and/or instructors may harness the analytics engine to explore the most significant factor(s) that contribute to student success within a course, a curriculum, and/or subject matter. The administrators and/or instructors may find value in analyzing these patterns or trends both at the end of a course' delivery or during the course. Based on this information, administrators and/or instructors may be armed with data that allows them to adapt future course offerings, or to assist other instructors in creating electronic learning curriculum and materials associated therewith.

For example, FIG. 3 illustrates a chart 30 that displays statistical information relating to responses to quiz questions. The chart may provide background information as to the question name 31 and type of answer called for 32. The chart may also illustrate correlation data 33 and a distribution as to the question score and final quiz score distribution 34. The analytics engine may query and display this information in a near real-time mechanism. Thus, a teacher or administrator may quickly access performance information which allow those stakeholders to gauge the effectiveness of the teaching, teaching mechanisms, and/or educational content.

Figure 4:
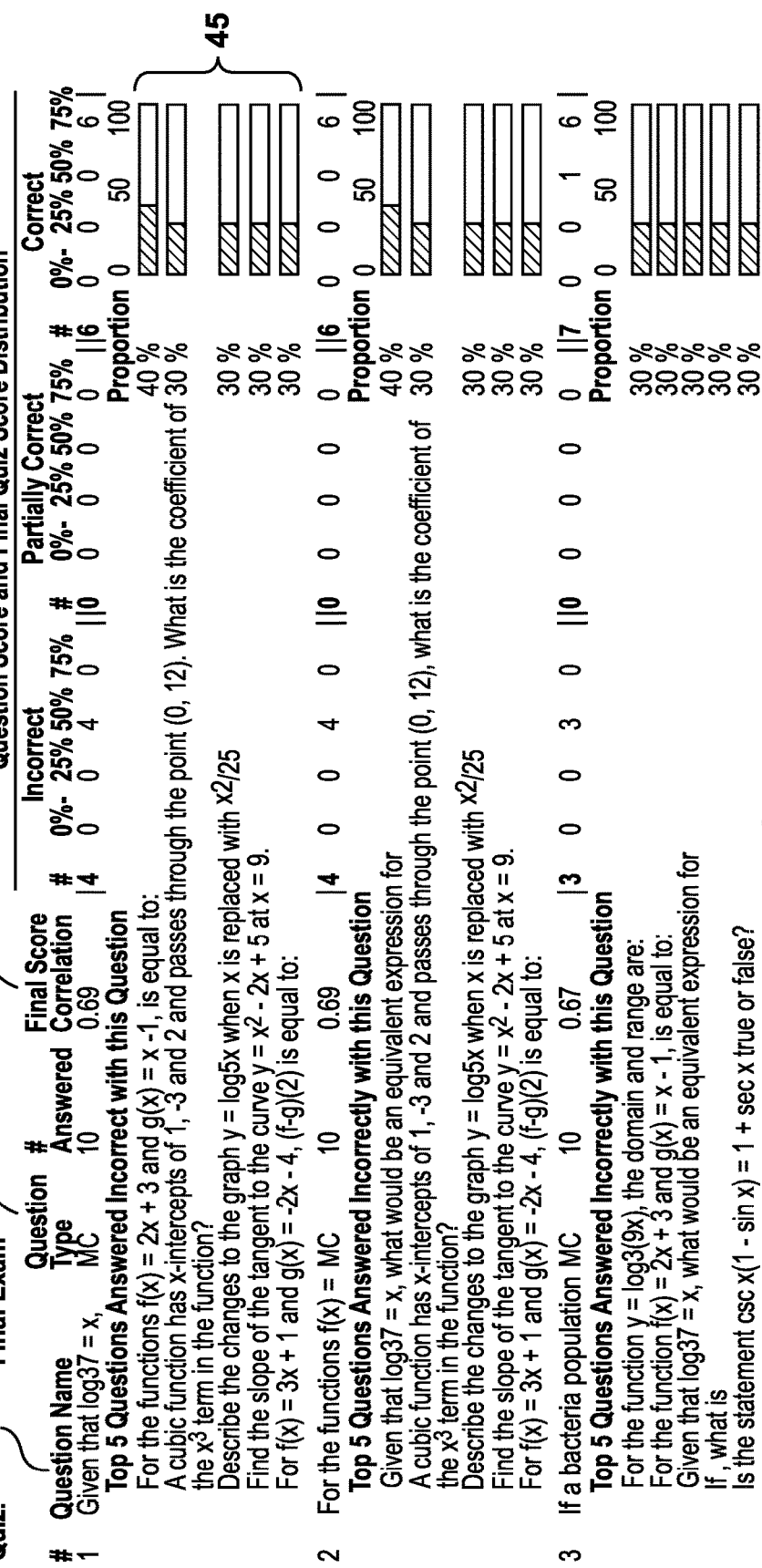
FIG. 4 is a chart that illustrates a detailed quiz statistics according to one embodiment.

FIG. 4 illustrates an expanded chart that displays statistical information relating to responses to quiz questions. The chart 40 of FIG. 4 is more detailed than the chart 30 of FIG. 30, because it displays a break-down 45 of the percentage of students which provided a similar answer.

In some embodiments, the analytics engine may be utilized to provide administrators with detailed information that corresponds to the popularity of certain courses, subject matter, or curricula. In particular, the analytics engine may provide a outline the number of hits that a course, subject matter, module, or topic had over the course of a defined period of time. Such information may communicate to administrators the extent to which the electronic learning system is being used by students, instructors, and/or departments.

Figure 5:
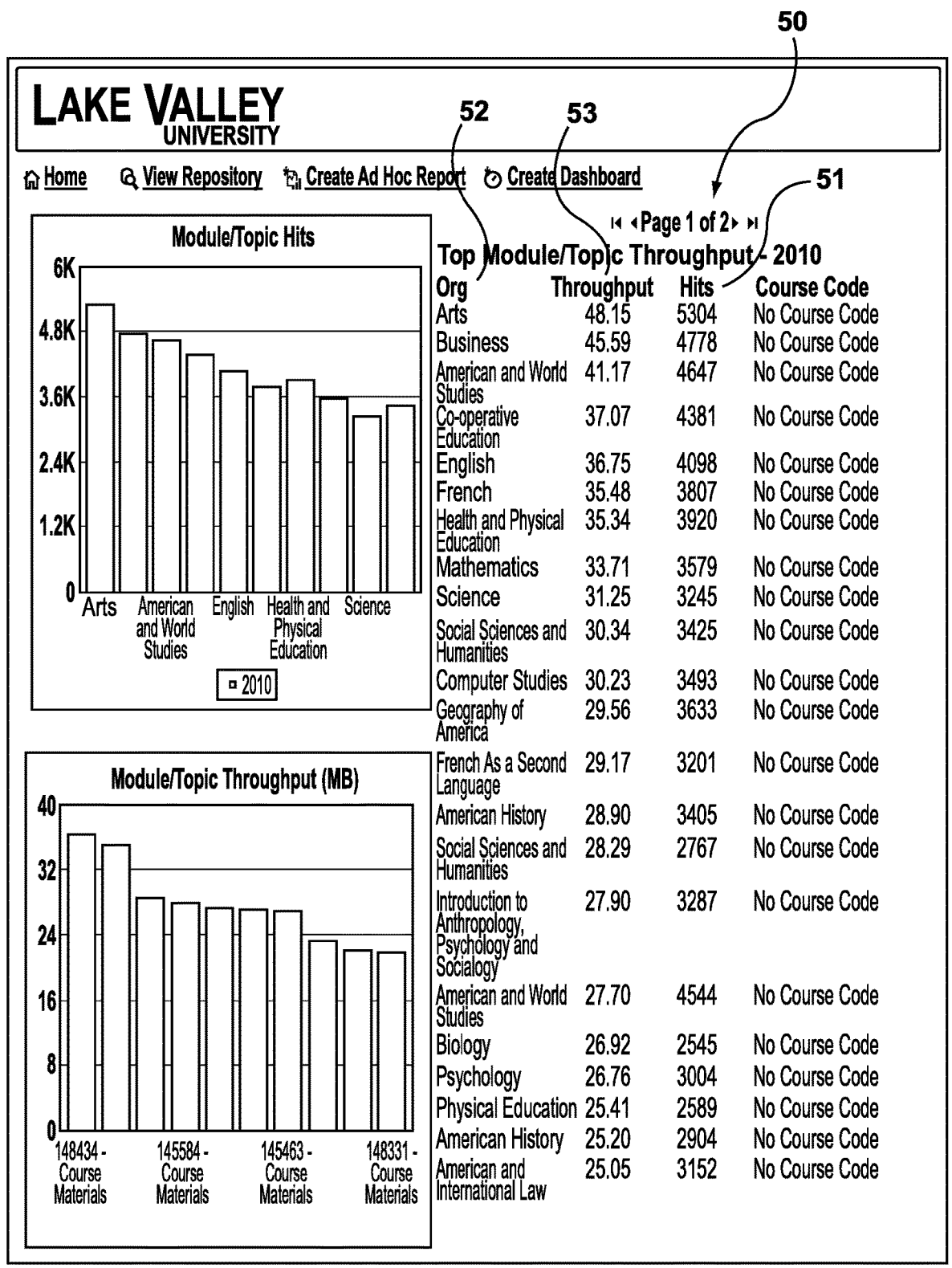
FIG. 5 is a chart that illustrates the use of a topic delivered on an electronic learning system according to one embodiment.

FIG. 5 illustrates a report 50 which communicates the number of hits 51 a course or topic 52 had over a predetermined period of time. In addition, FIG. 5 illustrates the throughput 53 or use that such a course or topic 52 experienced over the predetermined period of time.

Figure 6:
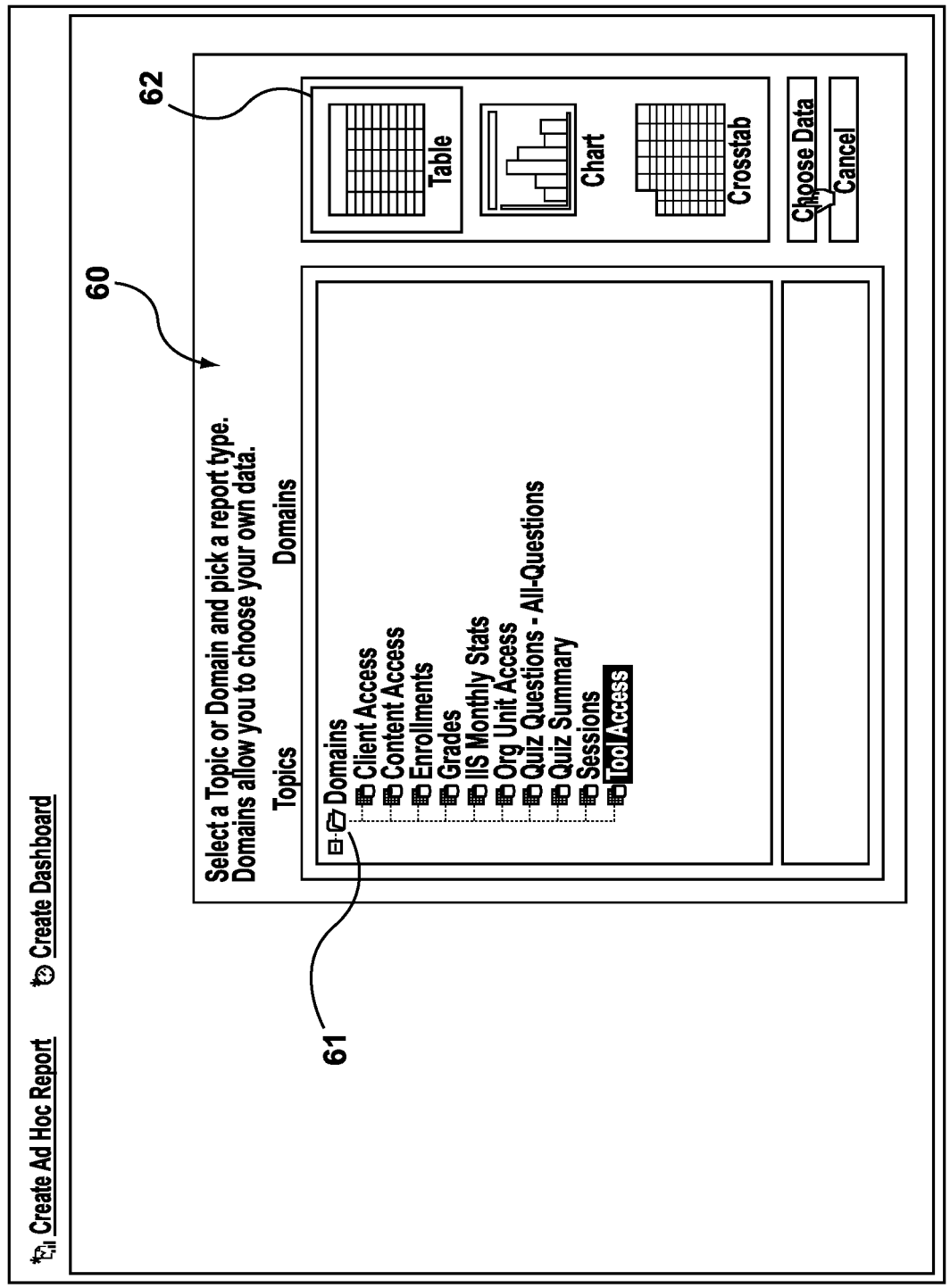
FIG. 6 is a screenshot that illustrates a report query page according to one embodiment.

In some embodiments, the administrators and/or instructors may have a large degree of control over the type of reporting done by the analytics engine. For example, FIG. 6 illustrates an interface 60 which the administrators and/or instructors may use in submitting report queries. For example, the administrators and/or instructors may choose the type of domain 61 for which their reports will be generated. The domains from which the administrators and/or instructors may choose to query may include, but are not limited to, client access (e.g., historical access information, etc), content access (e.g., historical access information, etc), enrollments, grades, IIS monthly stats, Org Unit Access (e.g., historical access information, etc), quiz questions, quiz summaries, sessions, and tool access (e.g., historical access information, etc).

In some embodiments, the analytics engine may also allow users (e.g., administrators, instructors, and/or students), to select the format in which the queried report is displayed. The format may be selected in the report format window 62 illustrated in FIG. 6. The report may be generated in formats including, but not limited to, tables, charts, and crosstabs displays.

Figure 7:
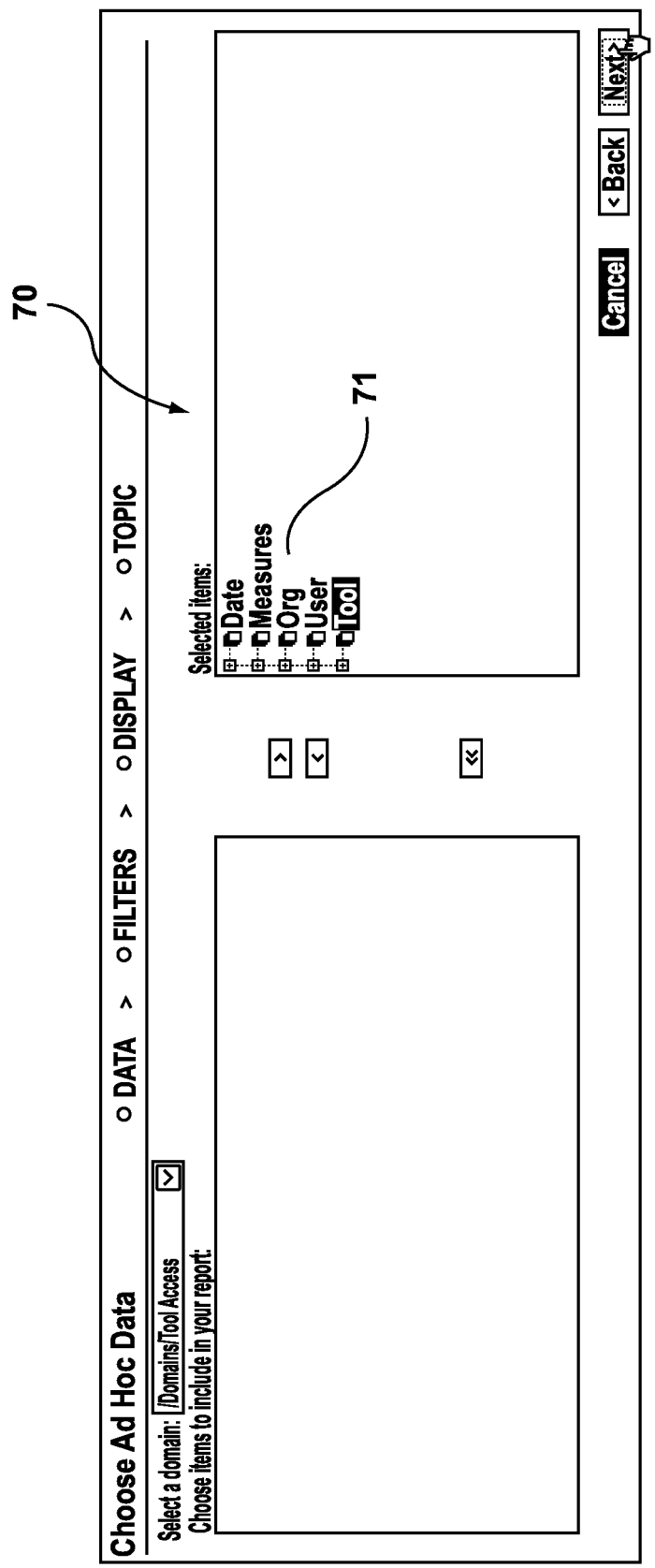
FIG. 7 is a screenshot that illustrates a report data selection page according to one embodiment.

In some embodiments, the analytics engine may be widely configurable to the needs of stakeholders (e.g., administrators, instructors, and/or students). For example, the analytics engine may allow a stakeholder to specifically identify data sets which are analyzed by the analytics engine and for which reports are generated. FIG. 7 illustrates a screenshot of the report data selection page 70 in which stakeholders may select the data 71 to be included in the report. Further, as illustrated in FIG. 8, the stakeholders may configure the analytics engine by specifying or at least having some input into the format of the report.

Figure 8:
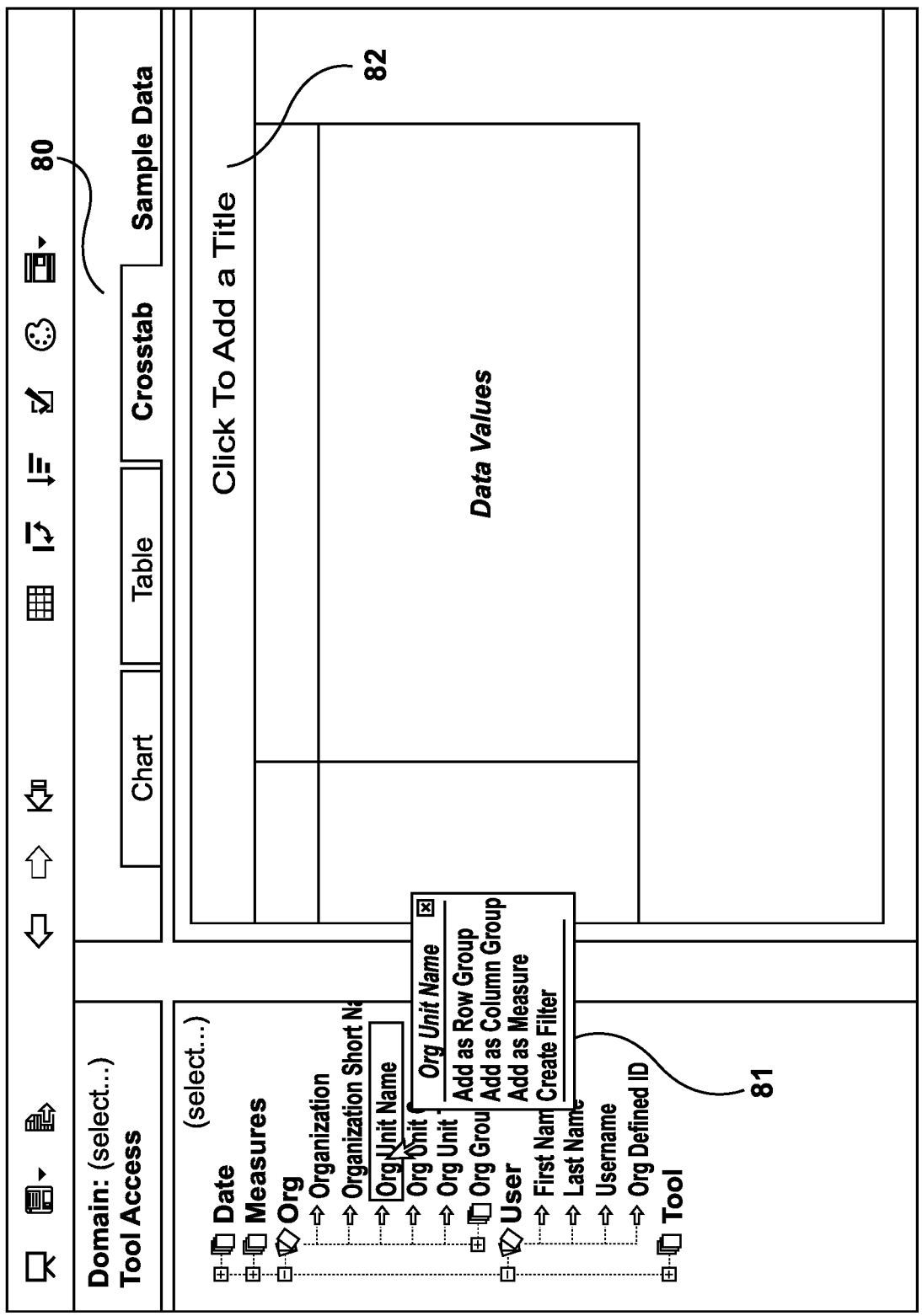
FIG. 8 is a screenshot that illustrates the report setup page according to one embodiment.

FIG. 8 illustrates a screenshot of the report setup page 80. The report setup page allows the stakeholders to specify which data to include in the report, the characteristics of this data (i.e., what role the data will have in the report) and to specify the identifiers in the report. Specifically, the stakeholder can specify the characteristics of the data, or how the data will be used in the report, by selecting the characteristics from the characteristics window 81. In addition, the stakeholder may specify identifiers such as the title on the report by inputting the identifier into the identifier window 82.

FIG. 9 illustrates a screenshot of the report setup page 90 in which stakeholders may further define the characteristics of the report to be generated by the analytics engine. For example, a stakeholder may select the units in which the queried data is displayed upon generation of the report. The units may be selected in the data group characteristics window 91.

Figure 10:
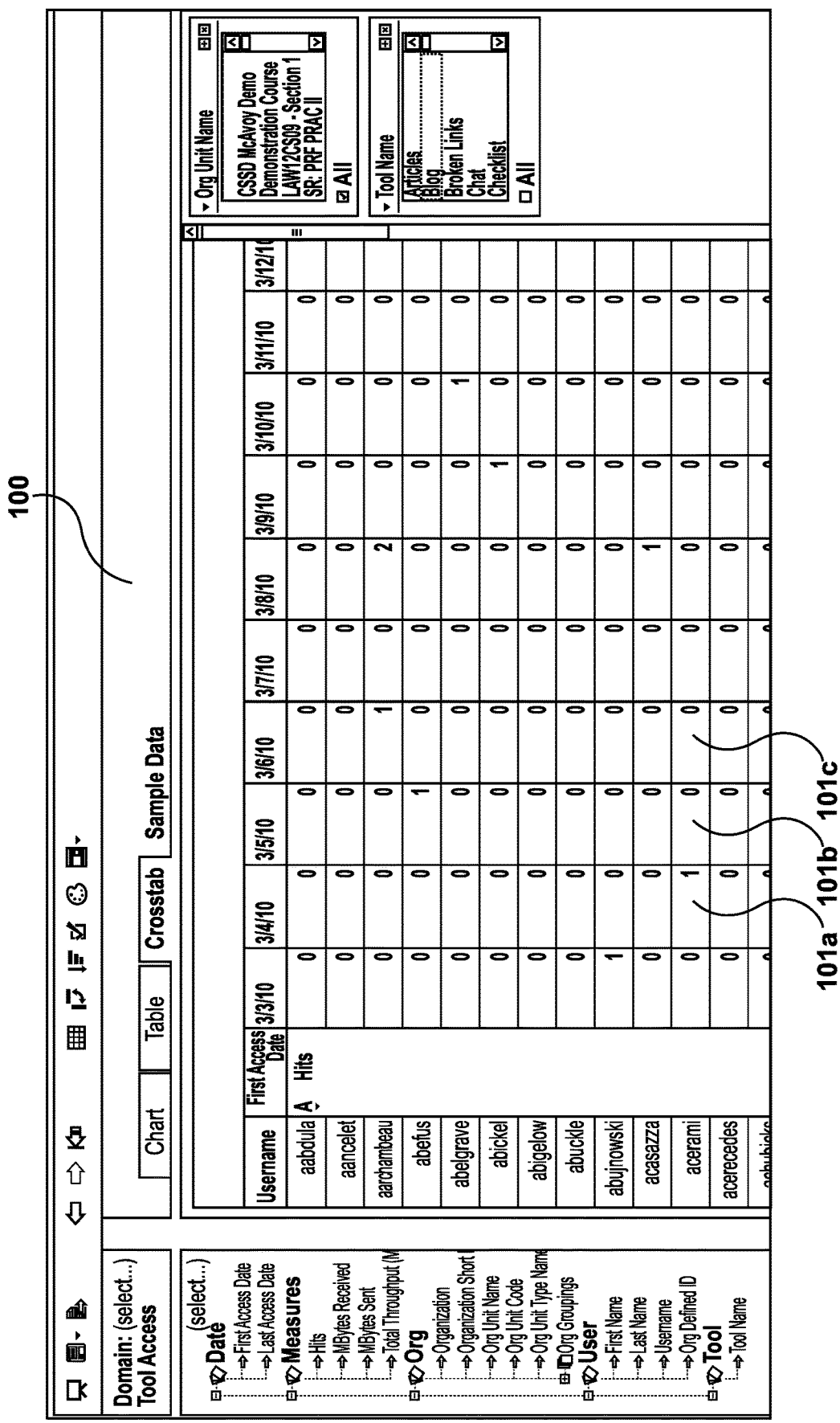
FIG. 10 is illustrates a screenshot of the report preview page according to one embodiment.

Finally, FIG. 10 illustrates a screenshot of the report preview page 100. As seen in FIG. 10, the individual data 101a, 101b, 101c, etc., may be populated in the report format selected by the stakeholder. This particular previewed report 100 illustrates the user access with respect to dates.

Figure 11:
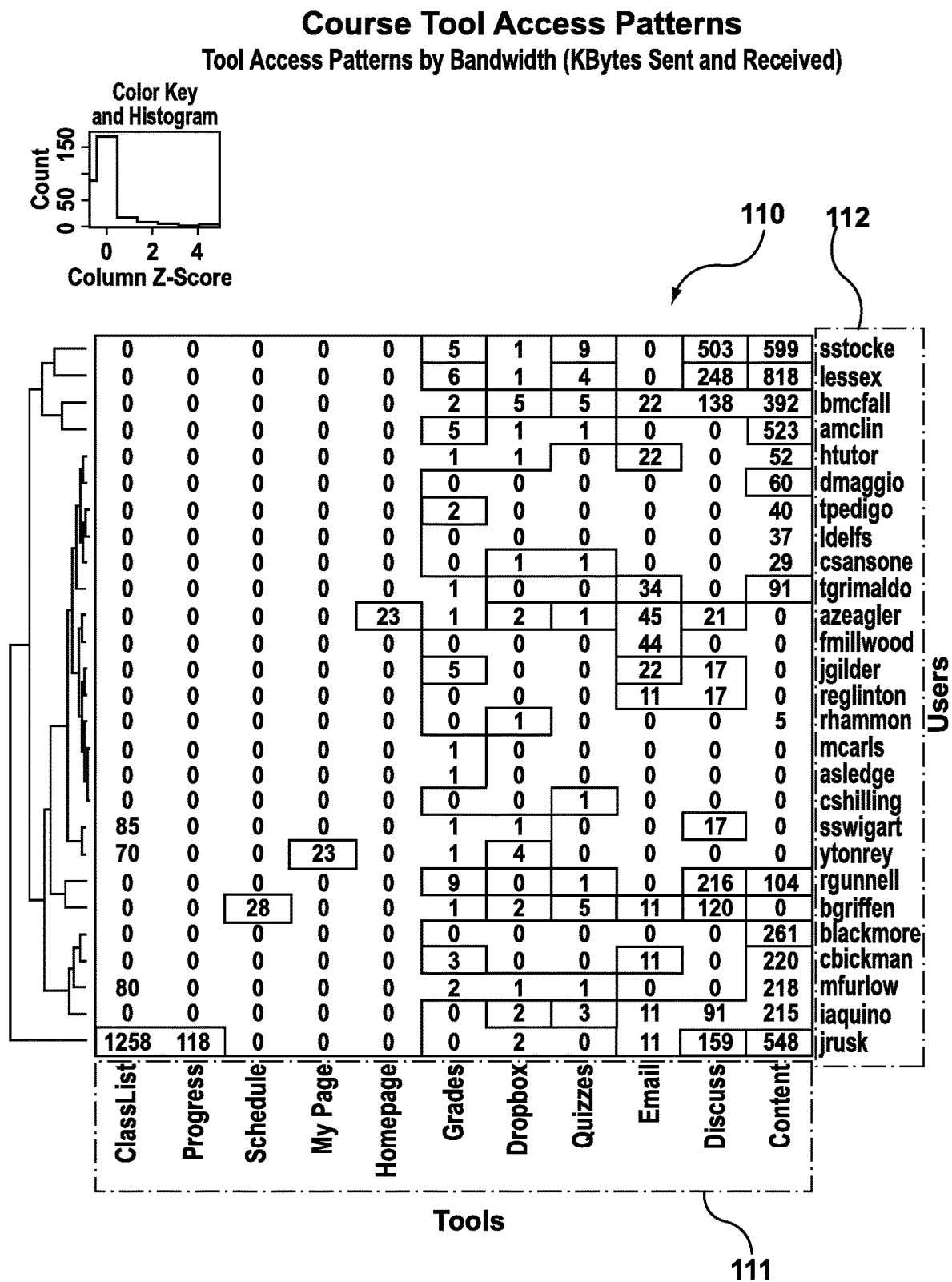
FIG. 11 illustrates a report according to one embodiment.

FIG. 11 illustrates a report 110 according to one embodiment. The report provides information relating to the user 112 access patterns of tools 111 with respect to bandwidth. Stakeholders may use such a report to gauge the usefulness and popularity of certain tools.

While the steps of the above methods have been described sequentially hereinabove, it should be noted that sequential performance of the steps may not need to occur for successful implementation of the method. As will be evident to one skilled in the art, rearranging sequence of performance of the steps, omitting the performance of some steps, or performing the steps in parallel may be possible without abandoning the essence of the invention.

While certain features have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. An electronic learning system comprising:
    a) a plurality of computing devices that communicate over a network with a learning management system;
    b) at least one server configured to:
        (i) provide the learning management system over the network;
        (ii) communicate with the plurality of computing devices;
        (iii) store information for the learning management system on at least one storage device that is coupled to the at least one server, the information associated with at least one of e-learning environment data, organizational data and usage data, the information comprising aggregate data based on interactions between a plurality of users and the learning management system via the computing devices;

(iv) capture, via a capture device, video, photo or audio data of users, compare and match the captured video, photo or audio data with stored user data based on a predetermined threshold corresponding to positive matches, and generate user engagement data based on the comparing and matching of the captured video, photo or audio data with stored user data; and (v) implement at least one analytics engine, wherein the analytics engine is configured:

to analyze the aggregate data and the user engagement data and generate correlation data based at least in part on the analyzed aggregate data and the user engagement data, the correlation data being indicative of a relationship between academic performance data and the user engagement data, the correlation data including at least one positive correlation data between the academic performance data and a user interaction with the learning management system, and to generate a recommendation to at least one of the plurality of users based on the at least one positive correlation data, wherein the recommendation includes at least one tool provided by the learning management system.

2. The system of claim 1, wherein the at least one positive correlation data corresponds to at least one variable that enhances an educational experience for at least one of the plurality of users.

3. The system of claim 2, wherein the at least one positive correlation data corresponds to factors relating to at least one of user demographic information, user behavioral characteristics, user learning preferences, user teaching preferences, educational delivery mechanisms.

4. The system of claim 1, wherein the analytics engine determines at least one negative correlation data within the learning management system.

5. The system of claim 4, wherein the at least one negative correlation data corresponds to at least one variable that acts as a detriment to an educational experience for at least one of the plurality of users.

6. The system of claim 5, wherein the at least one negative correlation data corresponds to factors relating to at least one of user demographic information, user behavioral characteristics, user learning preferences, user teaching preferences, educational delivery mechanisms.

7. The system of claim 1, wherein the recommendation includes at least one generated report in the form of at least one of: a mosaic plot, a heat diagram, a correlogram, a pie chart, a tree diagram, and a chart.

8. The system of claim 7, wherein the at least one report identifies specific learning users that are performing at a level below a predetermined threshold.

9. The system of claim 1, wherein the recommendation includes at least one report identifies subject matter in an educational curriculum which was not adequately understood by learning users.

10. The system of claim 1, wherein the recommendation includes at least one report that communicates a learning delivery mechanism to which at least one specific learning user responds better than other learning delivery mechanisms.

11. The system of claim 1, wherein the at least one server forms at least one grouping of a plurality of students in a course based at least in part on an analysis of one or more of the e-learning environment data, the organizational data, and the usage data, the analysis identifying users having behavior or results that are similar within a degree of confidence.

12. The system of claim 1, wherein the interactions comprise the times of electronic submissions of quizzes by the plurality of users and the responses submitted within the quizzes, and wherein the user pattern identifies a concern regarding academic integrity in connection with plurality of students that submitted corresponding quizzes based at least in part on whether the quizzes are submitted within a threshold amount of time and whether a correlation among the responses to the quizzes exceeds a preset correlation threshold.

13. A computer program product for providing an electronic learning system, the computer program product being embodied in a non-transitory tangible computer readable storage medium and comprising computer instructions for:

providing a learning management system to a plurality of computing devices over a network, wherein to provide the learning management system includes to communicate with the plurality of computing devices;

storing information for the learning management system, the information associated with at least one of e-learning environment data, organizational data and usage data, the information comprising aggregate data based on interactions between a plurality of users and the learning management system via the computing devices;

capturing video, photo or audio data of users, comparing and matching the captured video, photo or audio data with stored user data based on a predetermined threshold corresponding to positive matches, and generating user engagement data based on the comparing and matching of the captured video, photo or audio data with stored user data; and implementing at least one analytics engine, wherein the analytics engine is configured to analyze the aggregate data and the user engagement data and generate correlation data based at least in part on the analyzed aggregate data and the user engagement data, the correlation data being indicative of a relationship between academic performance data and the user engagement data, the correlation data including at least one positive correlation data between the academic performance and a user interaction with the learning management system, and to generate a recommendation to at least one of the plurality of users based on the at least one positive correlation data, wherein the recommendation includes at least one tool provided by the learning management system.

14. The computer program product of claim 13, wherein the at least one positive correlation data corresponds to at least one variable that enhances an educational experience for at least one of the plurality of users.

15. The computer program product of claim 13, wherein the at least one positive correlation data corresponds to factors relating to at least one of user demographic information, user behavioral characteristics, user learning preferences, user teaching preferences, educational delivery mechanisms.

16. A method for analyzing information captured in an electronic learning system, the method comprising:

a) identifying a plurality of users associated with a learning management system;

b) providing, over a network, the learning management system to a plurality of computing devices associated with the plurality of users associated with the learning management system;
c) storing information associated with at least one of e-learning environment data, organizational data, and usage data, the information comprising aggregate data based on interactions between the plurality of users and the learning management system via the computing devices;
capturing video, photo or audio data of users, comparing and matching the captured video, photo or audio data with stored user data based on a predetermined threshold corresponding to positive matches, and generating user engagement data based on the comparing and matching of the captured video, photo or audio data with stored user data; and
d) implementing an analytics engine, wherein the analytics engine is configured:
   to analyze the aggregate data and the user engagement data and generate correlation data based at least in part on the analyzed aggregate data and the user engagement data, the correlation data being indicative of a relationship between academic performance data and the user engagement data, the correlation data including at least one positive correlation data between the academic performance data and a user interaction with the learning management system, and
   to generate a recommendation to at least one of the plurality of users based on the at least one positive correlation data, wherein the recommendation includes at least one tool provided by the learning management system.

17. The method of claim 16, wherein the analytics engine analyzes data and determines the correlation data that corresponds to an interaction between at least two variables of an electronic learning system.

18. The method of claim 16, wherein based on the correlation data, the analytics engine further recommends mechanisms for enhancing at least one of the plurality of user's interaction with learning management system.

* * * * *